Figure 1:
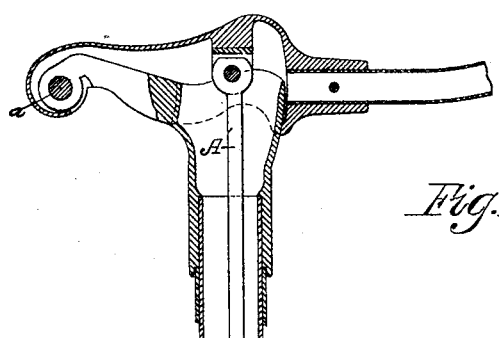
Figure 1:
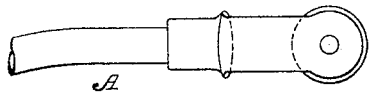

No. 635,816. Patented Oct. 31, 1899.
E. A. SPERRY.
SYSTEM AND APPARATUS FOR CONTROLLING VEHICLES.
(Application filed Sept. 17, 1898.)
(No Model.) 2 Sheets—Sheet 1.

WITNESSES:
Budd Gray.
M. C. Prendergast

INVENTOR
Elmer A Sperry
BY Buckingham Hewart,
ATTORNEYS.

No. 635,816. Patented Oct. 31, 1899.
E. A. SPERRY.
SYSTEM AND APPARATUS FOR CONTROLLING VEHICLES.
(Application filed Sept. 17, 1898.)
(No Model.) 2 Sheets—Sheet 2.
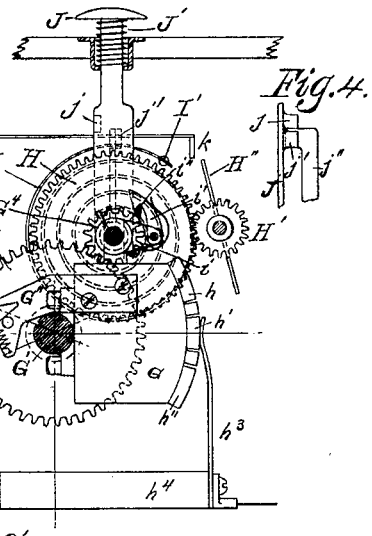
Fig. 3.
Fig. 4.
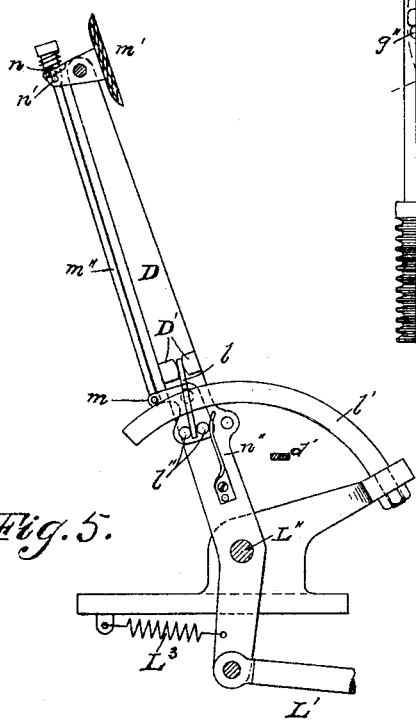
Fig. 5.
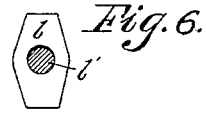
Fig. 6.
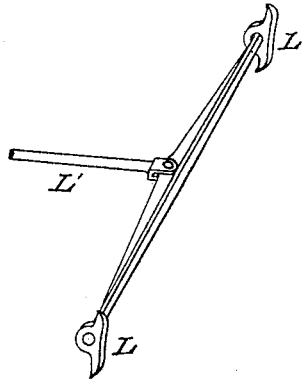
WITNESSES:
Budd Gray.
M. C. Prendergast.
INVENTOR
Elmer A Sperry.
BY Buckingham & Evarts
ATTORNEYS.
THE NORRIS PETERS CO., PHOTO-LITHO., WASHINGTON, D. C.

UNITED STATES PATENT OFFICE.

ELMER A. SPERRY, OF CLEVELAND, OHIO, ASSIGNOR TO THE CLEVELAND MACHINE SCREW COMPANY, OF SAME PLACE.

SYSTEM AND APPARATUS FOR CONTROLLING VEHICLES.

SPECIFICATION forming part of Letters Patent No. 635,816, dated October 31, 1899.

Application filed September 17, 1898. Serial No. 691,150. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Systems and Apparatus for Control of Vehicles, of which the following is a specification.

My invention relates to devices for controlling the various operations relating to starting, stopping, accelerating, and retarding vehicles, and it especially relates to electrical vehicles; and it has for its special objects to provide means for interlocking various of the operations connected with the control and braking, to provide what may be termed an "automatic" speed regulation, a variable or graduated resistance to the application of the brake or one of the brakes of the vehicle, means for causing the brake-magnets to instantly release their hold upon the part which they grasp or retard, various connections between such magnet and the generators or other source of electrical energy, and other details and arrangements now to be fully described and which are shown in the drawings, in which—

Figure 2:
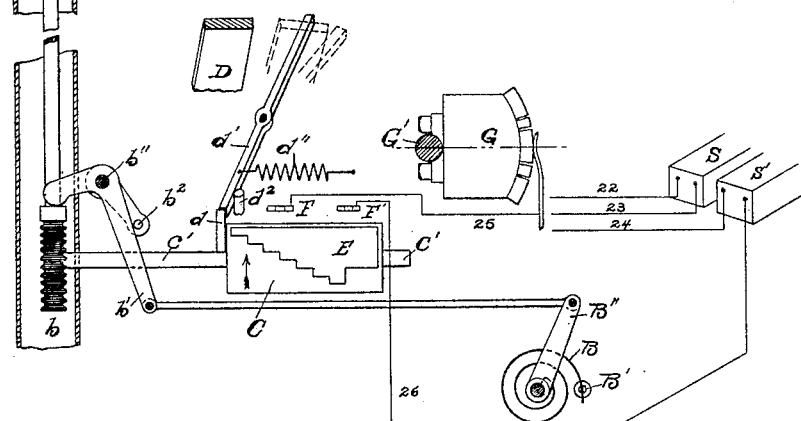

Figure 1 is a diagrammatic view of one of the portions of the control, showing also diagram of circuits. Fig. 2 is a diagram of the circuit connections of the electrical brake, showing certain controller-contacts. Fig. 3 is an elevation of the automatic circuit-changing devices. Fig. 4 is a detail of the escapement. Fig 5 is a detail of a brake-actuator. Fig. 6 is a detail of the locking-washer forming a part of Fig. 5.

Similar letters and figures of reference refer to like parts throughout the several views.

It will be at once seen that in directible road-vehicles there is one handle, lever, or the equivalent which must be at all times under the direct control, if not directly in the grasp, of the driver. This is the steering-handle, and it is desirable that this one handle should do as much of the total work of driving the vehicle and perform as many functions in this connection as possible. In former applications and patents I have shown how a single controller-handle may be made to perform a number of different functions in connection with operation of electrical cars and vehicles, and in the present application it will be noticed that the work required of the controlling-handle is reduced to a minimum, being virtually that of making and breaking the electric circuit which controls the flow of energy to the motor, thus limiting to a very large degree its necessary range of movement, especially when compared with other arrangements of control, where I have caused it to perform not only the above functions, but others along the line of speed control. This latter function, in the present case, I prefer to perform by automatic means—for instance, by means of a power-motor, which may be of any suitable kind—for instance, a spring—which in this case may be energized by any of the movements of the manipulating-levers—for instance, the one by means of which the current is turned on and off after the automatic manipulator has set the device for a certain predetermined speed or combination of speeds. With this explanation the parts will readily be recognized as follows:

The controlling-handle A, pivoted at $a$, causes a vertical movement of the rack-rod A'. This rod serves to connect the controller devices, which are preferably removed from the handle, so that the various interlocks and connections may be more readily made. The connection with the moving parts may be effected in any suitable manner—for instance, the rack $b$ and pinion $c$. (More clearly shown in Fig. 3.) This latter serves to operate a shaft $c'$, journaled in any suitable bearings—for instance, that shown at $c''$, also shown in Fig. 3. Upon the shaft $c'$ is mounted the cylinder C of the controller, upon which may be seen the various electric contacts presently to be described.

Connected with the moving part at any suitable point may be seen the interlocking stop $d$, which in this case rises from the shaft $c'$ and engages at its end the lever $d'$, pivoted as shown and protruding so as to be intercepted by the movement of the brake-actuator D, to be seen in Fig. 5. The locking-lever $d'$ may be also seen in this figure, and it is when lever the D has been fully retracted that the lever $d'$ is thrown out of engagement with the pin $d$, as is evident by the dotted lines in Fig. 1, in which case the spring $d''$ is retracted and the end of the lever is thrown away from the stop $d^2$. When it is thus thrown away from the stop, the controller is free to move in either direction; but in the position shown in the drawings, Fig. 1, the controller may be moved only in direction opposite to the arrow upon the cylinder. The diagram of contacts upon this cylinder will be seen in Fig. 2 to consist of a step-by-step contact E, another contact E', insulated from the former, auxiliary spring-contacts $e$ and $e'$, connected to their respective surface contacts, and movable surface contacts $e''$ and $e^3$. These latter contacts are loosely mounted upon the shaft $c'$ and coöperate with contacts E'' and E³. Other contacts engage the controller-contacts E and are indicated at E⁴ to E¹⁰, which are in the brake-circuit, and F and F', which are in the main circuit.

Other parts are shown in the figures, which will be referred to in the further description.

Passing now to the automatic circuit-changing switch G, it will best be described in connection with Figs. 3 and 4, in which we recognize the connection to the controlling-handle A', the rack $b$, pinion $c$, shaft $c'$, &c. The switch G is here seen to be pivoted on shaft G' and carries a set of three contacts—viz., $h$, $h'$, and $h''$—which coöperate with stationary contacts $h^3$, mounted upon the base $h^4$ and supplied with means for the proper electrical connections in the usual manner. Connected with the shaft G' will be seen an arm G'', upon the end of which is pivoted a trip $g'$, coöperating with a pin $g''$ upon the stem A'. Upon this same shaft we also find the gear G³, meshing with the pinion G⁴. The latter is supplied with a spring-winding shaft and a crank $i$, serving to pivot a spring-pressed dog $i'$, engaging a tooth $i$, mounted on a gear H. Upon the same pivot with the pinion G⁴ will be found loosely mounted the gear H, meshing with the pinion H'. The fan H'', operated by this pinion, serves a retarding device; but any other form of retarding device may be employed or the device may be operated without the use of retarding devices. The power-spring I may be seen to have one of its ends fastened at the point I', and its other end is secured to the shaft of the pinion G⁴.

It will be seen that whenever the stem A' descends into engagement with the trip $g'$ it will simply turn upon its pivot and when it has passed snap back to the position shown in the drawings, against the stop, by means of the spring $g^3$; but when the pin $g''$ rises under it the whole controller G and gear G³, pinion G⁴, and dog $i'$ are turned in the direction in which the dog points one entire revolution for each angular distance between the centers of the contacts $h$, $h'$, and $h''$ until by the angular movement the pin $g''$ passes the trip $g'$ and continues to pass upwardly, thus energizing the power-spring I, and when again released this spring starts backward until it may be engaged by the pin $g''$, the dog locks with the tooth $i''$ on gear H, and thus stands until the gear is released by any suitable mechanism.

One form of releasing device will now be described. This consists in the pedal J, thrust upwardly by the spring J' and guided in any suitable manner, as shown. This pedal is supplied with a duplex contact consisting of two projections. (Shown in longitudinal elevation in Fig. 4.) These may be lettered $j$ and $j'$ and coöperate with a revolving projection $j''$, rising from the gear H. It will be seen that when the pedal $j$ is pressed downwardly the projection $j''$ passes up between the two stops and makes an entire revolution, whereupon it is intercepted by the stop $j$. When the spring J' is allowed to elevate the pedal $j$, the stop $j''$ simply drops from the stop $j$ to the releasing-stop $j'$ and there remains until the next downward pressure of the release or pedal J. The entire revolution made by the stop $j'$ causes a new lot of contacts to engage with the contact $h^3$. This movement will not be instantaneous, on account of the retarding action of the fan H''. Again, it will be seen that an additional stop $k$, actuated by one of the moving parts—for instance, the rod A'—may be brought down until it will contact with the fan H'', and in this event, even though the release J is operated, no movement of the controller G will take place. It will be seen that the stop $d'$ in arresting the motion of the manipulator A' affects the releasing device $k$, with which it is connected.

Passing now to the brake arrangement, (shown in Figs. 5 and 6,) the brake-shoes L will at once be recognized connected with the brake-lever D by the link L'. The lever D is pivoted at L'' and retracted by the spring L³. This lever bears a jaw stationary with the arm D, (indicated at D',) which serves to impinge one end of a perforated plate or washer $l$. (Shown in Fig. 4.) The aperture of this washer is nearly filled by a rod $l'$, properly secured to the structure and bent so as to be concentric with the pivot L''. The lower end of the washer L is secured within another jaw L'', which may be moved with reference to the lever D and is located upon any moving part—for instance, the bell-crank $m$, connected to the pedal $m'$ by the link $m''$, by means of which the bell-crank is operated, as shown. An additional feature, consisting of a spring $n$, provides resilience in one direction and holds the pin $n'$ at the bottom of the slot of the jaw or link $m''$. A spring $n''$ is shown tilting the jaw $l''$ in position suitable for causing the washer $l$ to grasp the rod $l'$, but is forced positively out of engagement by tilting the pedal $m'$ over to the left, and its locking effect may be still further strengthened by tilting in an opposite direction and thereby compressing the spring $n$, which in this case acts in conjunction with spring $n''$, as will readily be understood. It will be remembered that when released this lever is drawn forward by the spring L³ until the end of the lever d' (shown in section in Fig. 5) is engaged, releasing the lock from the controller, as before explained.

Having now described the mechanical devices and their operations, the electrical circuits and their principal functions will be briefly described, as follows: Any source of electrical supply may be used—as, for instance, the storage batteries S and S', in which case it is preferable to have a plurality of separate generating-units, which may be coupled in various combinations with the motor or other driving element, or the speed or current limiting or controlling devices may be of such a nature as to require the batteries or other source constantly coupled as a single unit. A preferred form, however, is the use of two or four generators or groups, which are coupled by the switch in multiple, series multiple, and in series for effecting the various speeds of the motor. The circuits from the generator S S' will be seen to be connected to the current-graduating switch G, which will be seen to be in series-circuit relation with the make-and-break contacts F and F', which in this case both contact with the single conductor E, whereupon the circuit is established through any suitable translating device—for instance, the motor M. The current-graduating devices, being automatically actuated, as described, and the make-and-break switch, being actuated by the controller-handle A, are also fully pointed out. It will now be seen that when all the resistance R is eliminated the circuit would be from the positive of the generator or generators, wire 14, contact E¹⁰, controller-contact E, brush E³, wire 15, wire 16, brake-magnets T T, wire 17 18, contact E'', contact E', wire 19, wire 20 or 21, back to the generator or generators, as will be seen. The current direction through the brake-magnets in this instance is shown by the arrow-heads in full lines. Upon removal of the brake from circuit, however, when the brushes E'' and E³ reach the moving contacts e'' and e³ the friction will cause them to move away from contacts E and E' and be brought into contact with the moving brushes e and e', whereupon their polarity will be reversed, sending the current through the brake-magnets in direction of the dotted arrows, which causes an instantaneous reversal of magnetism, instantly throwing the brake-shoes away from the mass, which they grasp or retard, as in the manner well understood. It will again be apparent that at this point all or nearly all of the resistance R has been reinserted in the circuit and the current thereby reduced to a predetermined value. The current between the generators S and S' and the current-graduating switch G passes upon the wires 22 23 24 and to the make-and-break switch by wire 25, thence to the motor by wire 26, switch 13 and 27, returning by wire 28, switch 12, and wire 29. It will thus be seen that duplicate brakes L L and T T are furnished, which are interlocked, and when either one is in action the controller-cylinder C of the make-and-break switch will be locked out of action for power, but not out of action for the application of the brake, so that either or both brakes may be applied, and when so applied the motor cannot be operated for power.

It will readily be understood that while it is designed to use the above parts in the relation shown, yet some may be used without the others, and the invention extends to such use. It will furthermore be readily understood that the construction and arrangement may be varied without departing from the spirit of the invention.

Having thus described my invention, what I claim as new, and desire to secure by Letters Patent, is—

1. In a system of control for electric vehicles, a source of electrical supply, a motor, a stopping-and-starting switch, an independent circuit-adjusting current-graduating device separate manipulators for the switch and the device, the switch and the device being in series-circuit relation.

2. In a system of control for electric vehicles, a source of electrical supply, a motor, a stopping-and-starting switch, an independent circuit-adjusting current-graduating device, independent manually-actuated manipulating mechanism for the switch and the device and a mechanical operating connection between them, the switch and the device being in series-circuit relation.

3. In a system of control for electric vehicles, a source of electrical supply, a motor, a stopping-and-starting switch, an independent circuit-adjusting current-graduating device, separate manipulators for the switch and the device, in combination with a locking mechanism between them, the switch and the device being in series-circuit relation.

4. In a system of control for electric vehicles, a source of electrical supply, a motor, a make-and-break switch, an independent circuit-adjusting current-graduating device, separate manipulators for the switch and the device and a mechanical locking mechanism locking the latter, operated by the former, when in its closed-circuit position, the switch and the device being in series-circuit relation.

5. In a system of control for electric vehicles, a source of electrical supply, a motor, a make-and-break switch, an independent circuit-adjusting current-graduating device, separate manipulators for the switch and the device and a mechanical locking mechanism locking the latter, released by the former when in its open-circuit position, the switch and the device being in series-circuit relation.

6. In a system of control for electric vehicles, a make-and-break switch, a current-graduating device, a manually-actuated to-and-fro-moving manipulator for the switch, a power-actuated manipulator for the device and a connecting mechanism acting during a movement in one direction only of the said manually-actuated manipulator.

7. In a system of control for electric vehicles, a make-and-break switch, a current-graduating device, a manually-actuated manipulator for the switch, a power-actuated manipulator for the device and a manually-actuated release for the power-manipulator.

8. In a system of control for electric vehicles, a make-and-break switch, a current-graduating device, a manually-actuated manipulator for the switch, a power-actuated manipulator for the device and a manually-actuated step-by-step release for the device.

9. In a system of control for electric vehicles, a make-and-break switch, a current-graduating device, a manually-actuated manipulator for the switch, a power-actuated manipulator for the device, a release for the device, a stop for arresting the motion of the manipulator and a connection from the manipulator to the said release.

10. In a system of control for electric vehicles, a make-and-break switch, a current-graduating device, a manually-actuated manipulator for the switch, a power-actuated manipulator for the device and a foot-treadle release for the device.

11. In a system of control for electric vehicles, a make-and-break switch, a current-graduating device, a manually-actuated manipulator for the switch, a power-actuated manipulator for the device and a spring-return foot-treadle release for the device.

12. In a system of control for electric vehicles, a source of electrical supply, a motor, a current-graduating device, a combined power-current-interrupting switch and brake-controller, a separate manipulator for the device and switch and a mechanical connection between the controller, when in its brake position only and the device.

13. In a system of control for electric vehicles, a source of electrical supply, a motor, a current-graduating device, a combined power-current-interrupting switch and brake-controller, a separate manipulator for the device and switch, a mechanical connection between the controller when in its brake position only and the device and a power storage between the connection and the device.

14. In a system of control for electric vehicles, a make-and-break switch, a motor, a plurality of separate generators upon the vehicle, a circuit-controlling device between the generators and motor, and independent manipulators for the switch and the device.

ELMER A. SPERRY.

Witnesses:
W. S. ROGERS,
M. C. PRENDERGAST.